Figure 13:
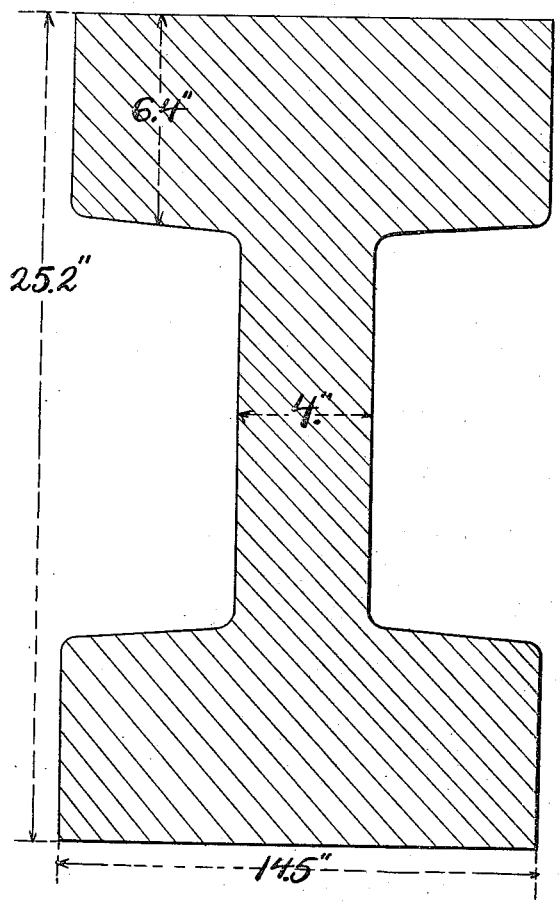

H. GREY.
SOLID ROLLED CROSS SECTIONALLY H SHAPED METAL BAR OR STRUCTURAL SECTION.
APPLICATION FILED SEPT. 11, 1903.
993,242.
Patented May 23, 1911.
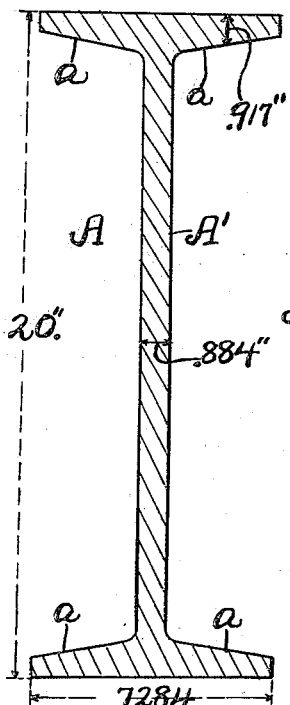
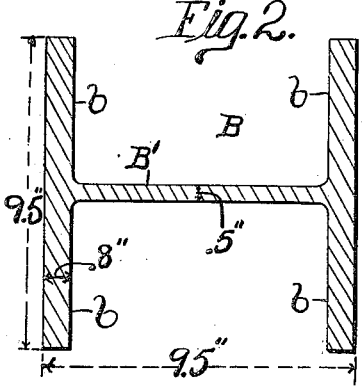
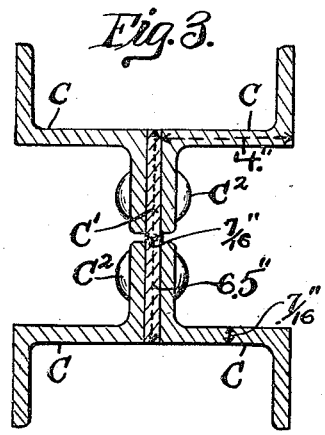
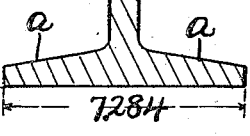
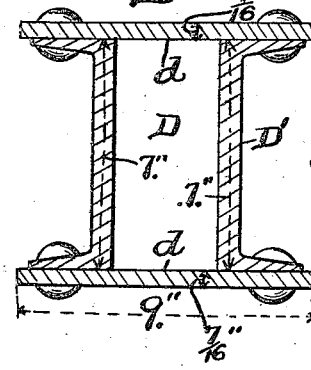
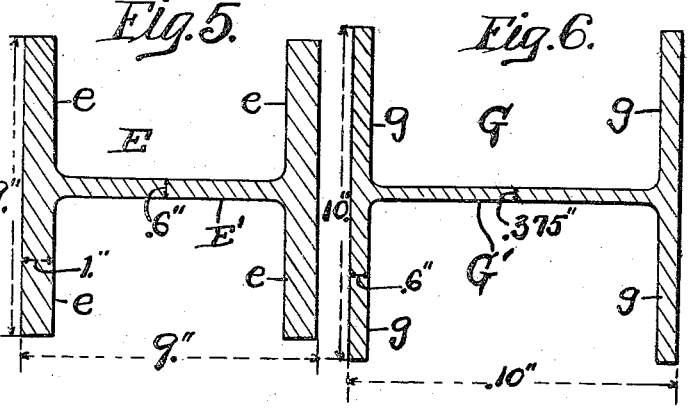
WITNESSES:
INVENTOR
Henry Grey
BY
Lynch & Dorer
ATTORNEYS.

H. GREY.
SOLID ROLLED CROSS SECTIONALLY H SHAPED METAL BAR OR STRUCTURAL SECTION.
APPLICATION FILED SEPT. 11, 1903.
Patented May 23, 1911.
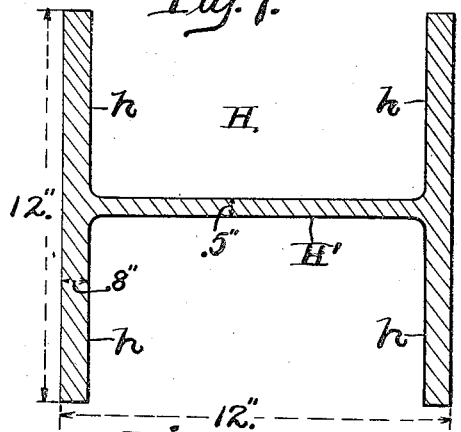
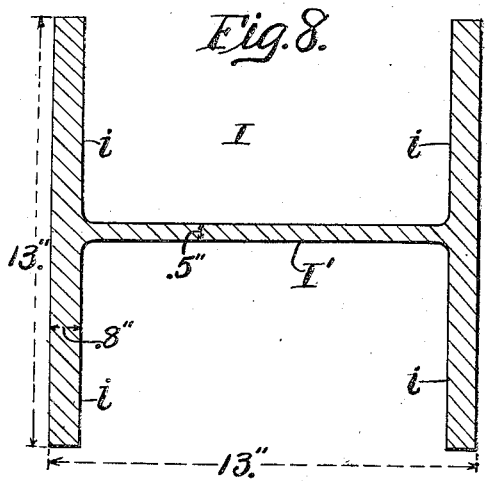
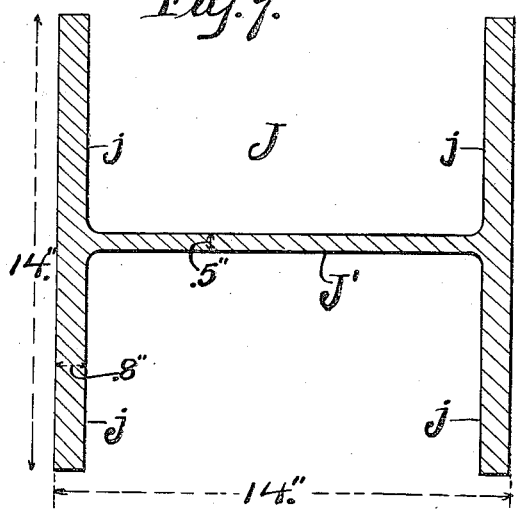
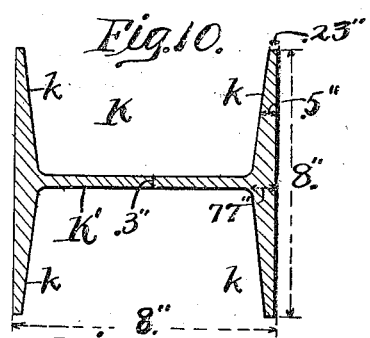
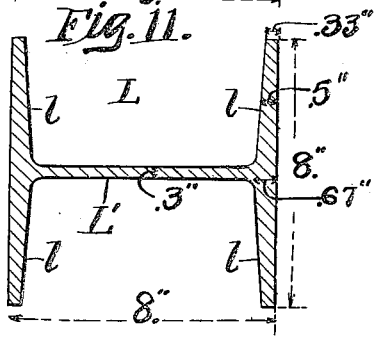
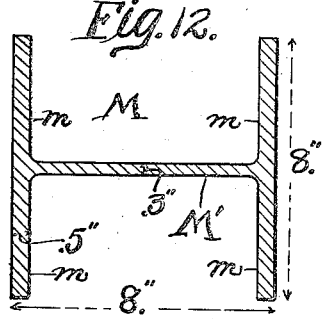

H. GREY.
SOLID ROLLED CROSS SECTIONALLY H SHAPED METAL BAR OR STRUCTURAL SECTION.
APPLICATION FILED SEPT. 11, 1903.

993,242.

Patented May 23, 1911.

3 SHEETS—SHEET 3.

WITNESSES:
Daniel E. Daly.
Jennie F. Ring.

INVENTOR
Henry Grey
BY
Lynch & Dorer
his ATTORNEYS.

UNITED STATES PATENT OFFICE.

HENRY GREY, OF NEW YORK, N. Y., ASSIGNOR TO AMERICAN UNIVERSAL MILL COMPANY, OF NEW YORK, N. Y., A CORPORATION OF WEST VIRGINIA.

SOLID-ROLLED CROSS-SECTIONALLY-H-SHAPED METAL BAR OR STRUCTURAL SECTION.

993,242.

Specification of Letters Patent. Patented May 23, 1911.

Application filed September 11, 1903. Serial No. 172,783.

*To all whom it may concern:*

Be it known that I, HENRY GREY, a citizen of the United States of America, residing at New York city, in the county of New York and State of New York, have invented certain new and useful Improvements in Solid-Rolled Cross-Sectionally-H-Shaped Metal Bars or Structural Sections; and I hereby declare the following to be a full, clear, and exact description of the invention, such as will enable others skilled in the art to which it pertains to make and use the same.

This invention relates to a cross-sectionally H-shaped solid rolled metal bar or structural section as a new commercial structural product designed for use as a column, post or compression-member.

The general object of this invention is to produce a solid rolled H-bar or structural section for use as a column and also suitable for use as a beam, but whose special feature is its great lateral strength. In other words, the object of this invention is to produce a column-forming solid rolled metal H-bar, of any given cross-sectional area, which bar or section, being in one piece and without rivets, constitutes a desirable open column or post, which, although equal in weight to an ordinary Z-bar column having the same cross-sectional area, has a minimum radius of gyration as great or greater, and will serve the same purpose as and be equal in lateral strength to the said Z-bar column without the necessity of punching, assembling and riveting the five members which together constitute the Z-bar column so generally used, and thereby avoiding the not inconsiderable cost of such punching, assembling and riveting, and the loss of time necessary for punching, assembling and riveting the different members required to make built-up columns.

To produce my new and valuable product I roll a solid rolled single metal bar having a cross-sectional contour corresponding with or approximating the letter H in shape, with a minimum radius of gyration equaling that of a riveted built-up column of the same or approximately the same cross-sectional area, and which, when cut to the required length, is already equal in load-carrying capacity with the built-up column produced, as already stated, by riveting together a number of metal plates or bars suitably shaped to form, when assembled and secured together, a column having the required minimum radius of gyration requisite for a fairly economical metal column.

It will be observed that to produce a solid rolled metal H-shaped single bar or structural section, equal in load-carrying capacity to a built-up column, and to render available, to the builder, a solid rolled metal column-forming single H-bar or structural section which weighs no more, per running foot, than a built-up column, are not only novel steps in the art, but valuable inasmuch as the cost of assembling and riveting the various members of a built-up column is not only avoided, but a column is produced which, having no rivets except at the connections, is more reliable in use and more quickly prepared for use than a column which must be rolled in a number of pieces which need punching, assembling and riveting before they are in a form equivalent to my solid rolled H-column.

In the accompanying drawings, Figure 1 is a cross-sectional view of a "twenty-inch" I-beam such as is now generally made, and A, in the said figure, designates the said beam, A', the web of the beam, and $a$, the flanges of the beam. The beam A is twenty inches (20″) in height,—that is, measures twenty inches (20″) between the outer sides of its flanges at one and the same side of the web A'. The beam A has a width of seven inches and two hundred and eighty-four thousandths of an inch (7.284″),—that is, measures seven inches and two hundred and eighty-four thousandths of an inch (7.284″) straight across the outer sides of adjacent oppositely projecting flanges of the beam. The weight of the beam A is one hundred (100) pounds per running foot. The thickness of the web A' is eight hundred and eighty-four thousandths of an inch (.884″), and the mean thickness of the flanges $a$ is nine hundred and seventeen thousandths of an inch (.917″). Obviously, therefore, the cross-sectional area of the beam A is twenty-nine square inches and forty-one hundredths of a square inch (29.41 sq. in.), and the minimum radius of gyration of the said beam is one and thirty-four hundredths inches (1.34″).

Fig. 2 is a cross-sectional view of a solid rolled cross-sectionally H shaped single column-forming bar or structural section embodying my invention, and B, in the said figure, represents the said bar; B', the web of the bar, and b, the flanges of the bar. The bar B measures nine and one-half inches (9.5") between the outer sides of its flanges at one and the same side of the web B'. The bar B measures nine and one-half inches (9.5") straight across the outer sides of adjacent oppositely projecting flanges of the bar. The weight of the said bar B is sixty-five and two tenths pounds (65.2 lbs.) per running foot. The thickness of the web B' is five tenths of an inch (.5"), and the mean thickness of the flanges b is eight tenths of an inch (.8"). Obviously, therefore, the cross-sectional area of the bar B is nineteen square inches and two tenths of a square inch (19.2 sq. in.), and the minimum radius of gyration of the said bar is two and forty-four hundredths inches (2.44").

Fig. 3 is a cross-sectional view of the "eight-inch" Z-bar column of commerce, being composed of four Z-bars C and a web plate C', with the said parts riveted together, as at C². The dimensions of the component parts of the said Z-bar column are indicated in inches in the said figure. The weight of the said Z-bar column, without rivets, is sixty-four and seven-tenths pounds (64.7 lbs.) per running foot. The cross-sectional area of the said Z-bar column is nineteen square inches (19 sq. in.), and the minimum radius of gyration of the said Z-bar column is two and forty-nine hundredths inches (2.49").

Fig. 4 is a cross-sectional view of a channel-column, and D, in the said figure, designates the said column. The column D is composed of two channel-bars D' and two side plates d, with the plates and bars riveted together. The bars D' respectively have a web seven inches (7") wide and weigh each nineteen and three quarters pounds. The plates d are each nine inches (9") wide and seven sixteenths of an inch thick. The weight, per running foot, of the column D is sixty-six and three tenths pounds (66.3 lbs.) exclusive of the rivets employed in securing the plates and bars together. The cross-sectional area of the column D is nineteen and one-half square inches (19.5 sq. in.), and the minimum radius of gyration of the said column is two and forty-five hundredths inches (2.45").

Fig. 5 is a cross-sectional view of a solid rolled cross-sectionally H-shaped single column-forming metal bar embodying my invention, and E, in the said figure, designates the said bar, and E' represents the web, and e, the flanges of the said bar. The bar E measures nine inches (9") between the outer sides of its flanges at one and the same side of the web E'. The bar E measures nine inches (9") straight across the outer sides of adjacent oppositely projecting flanges of the bar. The bar E has a weight of seventy-five and forty-eight hundredths pounds (75.48 lbs.) per running foot, having a thickness in its web E' of six tenths of an inch (.6"), and a mean thickness in the flanges e of one inch (1"). Obviously, therefore, the cross-sectional area of the bar E is twenty-two and two-tenths square inches (22.2 sq. in.), and the minimum radius of gyration of the said bar is two and thirty-three hundredths inches (2.33").

Fig. 6 is a cross-sectional view of a solid rolled cross-sectionally H-shaped single column-forming metal bar embodying my invention, and G, in the said figure, represents the said bar, and G' designates the web, and g the flanges, of the said bar. The bar G measures ten inches (10") between the outer sides of its flanges at one and the same side of the web G'. The bar G measures ten inches (10") straight across the outer sides of adjacent oppositely projecting flanges of the bar. The bar G has a weight of fifty-one pounds and eighty-five hundredths of a pound (51.85 lbs.) per running foot, having a web G' whose thickness is three hundred and seventy-five thousandths of an inch (.375"), and flanges g whose mean thickness is six-tenths of an inch (.6"). Obviously, therefore, the cross-sectional area of the bar G is fifteen and one-fourth square inches (15.25 sq. in.), and the minimum radius of gyration of the said bar is two and fifty-six hundredths inches (2.56").

Fig. 7 is a cross-sectional view of a solid rolled cross-sectionally H-shaped single column-forming metal bar embodying my invention, and H, in the said figure, designates the said bar, and H' represents the web, and h, the flanges of the said bar. The bar H measures twelve inches (12") between the outer sides of its flanges at one and the same side of the web H'. The bar H measures twelve inches (12") straight across the outer sides of adjacent oppositely projecting flanges of the bar. The bar H has a weight of eighty-three pounds (83 lbs.) per running foot, being five-tenths of an inch (.5") thick in the web H', and having a mean thickness of eight tenths of an inch (.8") in the flanges h. Obviously, therefore, the cross-sectional area of the bar H is twenty-four square inches and four-tenths of a square inch (24.4 sq. in.), and the minimum radius of gyration of the said bar is three and seven-hundredths inches (3.07").

Fig. 8 is a cross-sectional view of a solid rolled cross-sectionally H-shaped single column-forming metal bar embodying my invention, and I, in the said figure, represents the said bar, and I' designates the web, and i, the flanges of the bar. The bar I measures thirteen inches (13") between the outer sides of its flanges at one and the same side of the web. The bar I measures thirteen inches (13") straight across the outer sides of adjacent oppositely projecting flanges of the bar. The bar I has a weight of ninety pounds (90 lbs.) per running foot, having a thickness of five-tenths of an inch (.5") in the web I', and a mean thickness of eight-tenths of an inch (.8") in the flanges i. Obviously, therefore, the cross-sectional area of the bar I is twenty-six and one-half square inches (26.5 sq. in.), and the minimum radius of gyration of the said bar is three inches and thirty-two hundredths of an inch (3.32").

Fig. 9 is a cross-sectional view of a solid rolled cross-sectionally H-shaped single column-forming bar embodying my invention, and J, in the said figure, designates the said bar, and J' represents the web, and j, the flanges of the bar. The bar J measures fourteen inches (14") between the outer sides of its flanges at one and the same side of the web J'.

Fig. 10 is a cross-sectional view of a solid rolled cross-sectionally H-shaped single column-forming metal bar, and, in the said figure, K represents the said bar, and K' designates the web, and k the flanges of the bar. The bar K measures eight inches (8") between the outer sides of its flanges at one and the same side of the web K'. The bar K measures eight inches (8") straight across the outer sides of adjacent oppositely projecting flanges of the bar. The thickness of the web K' is three-tenths of an inch (.3"). The flanges k are seventy-seven hundredths of an inch (.77") thick at the root and twenty-three hundredths of an inch (.23") thick at their longitudinal edges, and, hence, the inner side of each flange k has a taper of less than fifteen per cent. and over twelve per cent.

Fig. 11 is a cross-sectional view of a solid rolled cross-sectionally H-shaped single column-forming metal bar, and, in the said figure, L, designates the said bar, and L' represents the web, and l the flanges of the bar. The bar L measures eight inches (8") between the outer sides of its flanges at one and the same side of the web L'. The bar L measures eight inches (8") straight across the outer sides of adjacent oppositely projecting flanges of the bar. The thickness of the web L' is three-tenths of an inch (.3"). The flanges l are sixty-seven hundredths of an inch (.67") thick at the root, and thirty-three hundredths of an inch (.33") thick at their longitudinal edges, and, hence, the inner side of each flange l has a taper of less than twelve per cent. and over five per cent.

Fig. 12 is a cross-sectional view of a solid rolled cross-sectionally H-shaped single column-forming metal bar, and, in the said figure, M represents the said bar, and M' designates the web, and m the flanges of the bar. The bar M measures eight inches (8") between the outer sides of its flanges at one and the same side of the web M'. The bar M measures eight inches (8") straight across the outer sides of adjacent oppositely projecting flanges of the bar. The thickness of the web M' is three-tenths of an inch (.3"). The flanges m have each a mean thickness of five-tenths of an inch (.5"), and the thickness of the flanges is the same or approximately the same between the roots and the longitudinal edges of the flanges so that the inner sides of the flanges are straight or approximately straight, that is, have substantially no taper or at least less than five per cent. taper.

Fig. 13 is a cross-sectional view of a cross-sectionally H-shaped metal blank suitable for use in producing the column or bar.

The state of the art prior to my invention, so far as I am aware, fails to disclose, first, the production of any cross-sectionally solid rolled H-shaped or I-shaped single bar having a minimum radius of gyration exceeding two inches (2"); second, any cross-sectionally H-shaped or I-shaped solid rolled single metal bar which measures nine and one-half inches (9.5") or more than nine and one-half inches (9.5") straight across adjacent oppositely projecting flanges of the bar; third, the production of a cross-sectionally H-shaped or I-shaped single metal bar which measures, straight across the outer sides of adjacent oppositely projecting flanges, more than ninety-two and one-half per cent. of the distance between the outer sides of the flanges at one and the same side of the web of the bar, and fourth, any cross-sectionally I-shaped or H-shaped solid rolled single metal bar whose flanges have no taper or approximately no taper, or even less than thirteen per cent. taper.

The new and valuable product illustrated in Figs. 2, 5, 6, 7, 8, 9, 10, 11 and 12, can be readily made by providing a cross-sectionally H-shaped suitably heated blank in which the thickness of the web and the mean thickness of each flange bear to each other the same or substantially the same proportion which the thickness of the said web and the mean thickness of the said flange are to bear to each other in the finished H-bar to which the said blank is to be reduced, and rolling the flanges and the web simultaneously and thereby reducing the mean thickness of each flange and the thickness of the web substantially in the proportion which the thickness of the said flange and the thickness of the web bear to each other in the blank. This method of reducing the said blank is invaluable to avoid imperfections, latent as well as visible, in any portion of the resulting product. As an example, a blank suitable for use in the manufacture of the H-column, illustrated in Fig. 9, is shown in Fig. 13, and the dimensions of the blank are indicated in the said figure. It will be observed that the blank measures fourteen and one-half inches (14.5″) straight across the outer sides of adjacent oppositely projecting flanges of the blank, and measures twenty-five and one-fifth inches (25.2″) between the outer sides of the flanges at one and the same side of the web of the blank. The thickness of the web of the blank is four inches (4″), and the mean thickness of each flange of the blank is six and two-fifths inches (6.4″). Hence, the mean thickness of each flange of the blank bears to the thickness of the web of the blank, the same or approximately the same ratio which the mean thickness of the said flange, when finished and as it is to exist in the H-column to which the blank is to be reduced, bears to the thickness of the web of the said column, and during each pass of the blank through the rolling-mill the mean thickness of each flange and the thickness of the web are simultaneously reduced substantially in the proportion which the mean thickness of the said flange and the thickness of the web bear to each other in the blank.

The carrying capacity of a column, post or compression member, for any given length, is dependent, first, upon its cross-sectional area, and the value of each square inch of cross-sectional area is dependent upon the minimum radius of gyration which is found by the well known formula $$\sqrt{\frac{I'}{A}},$$

in which $I'$ stands for the moment of inertia with the neutral axis coincident with the center of the web, and $A$, for the cross-sectional area. The greater the minimum radius of gyration, the greater is the value of each square inch of cross-sectional area.

No solid rolled H-bar or structural section, whose cross-sectional area and minimum radius of gyration will permit of its economical use as a column, has ever, to my knowledge, been devised or designed prior to my invention. The largest beam or bar or structural section rolled in America, having the greatest minimum radius of gyration combined with the largest cross-sectional area, is the "twenty-inch" beam shown in Fig. 1 and weighing one hundred pounds per running foot, which beam, as already indicated, has a cross-sectional area of about twenty-nine and two-fifths square inches and a minimum radius of gyration of about one and one-third inches. A column eighteen feet in length made from one bar of the section illustrated in Fig. 1 should support about two hundred and thirty thousand pounds, with a factor of safety of four to one, whereas a column eighteen feet in length, made from the new section shown in Fig. 2, with a cross-sectional area of nineteen and one-fifth square inches, would have the same load-carrying capacity and would weigh only about sixty-five per cent. of the former. It is evident, therefore, that if the bars illustrated in Figs. 1 and 2 can be produced at the same cost per ton, the saving effected, in the use of the new shape shown in Fig. 2, would amount to approximately thirty-five per cent.

The Z-bar column illustrated in Fig. 3, or the channel-bar column shown in Fig. 4, would each carry the same load as the column made from the new section shown in Fig. 2. The said Z-bar column and the said channel-bar column would each weigh about the same, per running foot, as would my solid rolled single H-column illustrated in Fig. 2, but the cost of assembling, punching and riveting the component parts or members of the composite columns would be considerable.

My object in inventing the solid rolled H-column illustrated in Figs. 2, 4, 5, 6, 7, 8, 9, 10, 11 and 12 is to make a column in one solid bar or piece without rivets, except for connections, and weighing no more, per running foot, than the considerably more expensive composite columns hereinbefore mentioned, and equal in load-carrying capacity to the said composite columns.

I would remark that the most desirable form into which an H-bar designed for use as a column, post or compression member can be rolled, is that in which the radii of gyration in both directions are nearly equal. For instance,—a section, such as is shown in Fig. 1, has a maximum radius of gyration of seven and one-half inches (7.5″) and a minimum radius of gyration of one and thirty-four hundredths inches (1.34″). The section, shown in Fig. 2, has a maximum radius of gyration of three and sixty-five hundredths inches (3.65″), and a minimum radius of gyration of two and thirty-three hundredths inches (2.33″), and it has hereinbefore been shown that the latter has an economy of about thirty-five per cent.

The lateral strength of any cross-sectional I-shaped or H-shaped bar or section is greater, the greater the minimum radius of gyration, and the wider the flanges of any such section are for any given height, the greater the minimum radius of gyration will be.

It will be observed, also, that another object of the invention which constitutes the subject-matter of this application, is to produce a solid rolled integral column-forming metal bar in the form of the letter H, with the inner sides of the flanges either perpendicular or approximately perpendicular to the adjacent side of the web or having a taper less than fiteen per cent., with the distance straight across the outer sides of adjacent oppositely projecting flanges of the bar equal or approximately equal to the distance between the outer sides of the flanges at one and the same side of the web of the bar, with the mean thickness of the flanges considerably greater than the thickness of the web, and with the mean thickness of each flange and the thickness of the web bearing to each other substantially the same proportion which the thickness of the said flange and the thickness of the web bear to each other in the blank.

One method which may be employed in rolling the structural shapes described and claimed herein forms the subject matter of a prior patent to me No. 758,529, granted April 26, 1904, and said method may be practiced or carried out on the rolling mills forming the subject matter of prior patents to me numbered 635,381 and 943,633, granted October 24, 1899 and December 14, 1909, respectively.

What I claim is:—

1. A solid rolled beam, substantially H-shaped in cross section, the height of which does not exceed seventeen inches and the width of which does not exceed sixteen inches, and the least radius of gyration of which exceeds two inches.

2. A solid rolled beam, substantially H-shaped in cross section, the height of which is substantially the same as the width of the flanges, and the thickness of the web of which is not more than two-thirds the mean thickness of the flanges.

3. As a new article of manufacture, a solid rolled beam having a web and a flange at each end of the web and extending substantially perpendicularly across the same so that each of said flanges forms two substantially right angles with said web, the width of said flanges being not less than eight and one-half inches nor more than fifteen and one-half inches, the height of the beam being substantially the same as the width of the flanges, and the thickness of the web of the beam being substantially five-eighths of the mean thickness of the flanges.

In testimony whereof, I sign the foregoing specification, in the presence of two witnesses.

HENRY GREY.

Witnesses:
C. H. DORER,
VICTOR C. LYNCH.